United States Patent
Voss et al.

(10) Patent No.: US 7,088,467 B1
(45) Date of Patent: Aug. 8, 2006

(54) DIGITAL VIDEO IMAGING WITH HIGH-RESOLUTION STILL IMAGING CAPABILITY

(75) Inventors: James S Voss, Loveland, CO (US); James W. Owens, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 904 days.

(21) Appl. No.: 09/900,072

(22) Filed: Jul. 6, 2001

(51) Int. Cl.
G06F 15/00 (2006.01)

(52) U.S. Cl. ............... 358/1.2; 358/1.9; 358/296; 345/419

(58) Field of Classification Search ............... 358/1.2, 358/1.9, 296, 419, 453; 345/419, 629; 382/453, 382/175, 232, 282; 348/14.11, 14.12, 14.14, 348/1.15
See application file for complete search history.

(56) References Cited

U.S. PATENT DOCUMENTS

| | | | |
|---|---|---|---|
| 5,128,776 A | * | 7/1992 | Scorse et al. ............... 382/240 |
| 5,341,174 A | | 8/1994 | Xue et al. |
| 5,696,848 A | * | 12/1997 | Patti et al. ............... 382/254 |
| 6,590,573 B1 | * | 7/2003 | Geshwind ............... 345/419 |
| 6,753,878 B1 | * | 6/2004 | Heirich et al. ............... 345/629 |

FOREIGN PATENT DOCUMENTS

| | | |
|---|---|---|
| EP | 0316770 | 5/1989 |
| JP | 9051499 | 2/1997 |
| WO | WO 99/33024 | 7/1999 |

* cited by examiner

Primary Examiner—Twyler M. Lamb

(57) ABSTRACT

Methods for providing digital video images and corresponding still images that exhibit a relatively higher resolution are provided. Preferably, the method includes the steps of: enabling frames of image data to be provided to a user for rendering as video images, the video images being configured for providing at a first resolution; receiving a request for image data corresponding to one of the frames of image data; and enabling image data corresponding to the requested one of the frames to be provided to the user for rendering as a still image, the still image being configured for providing at a second resolution. Preferably, the second resolution is higher than the first resolution. Systems and computer readable media also are provided.

16 Claims, 6 Drawing Sheets

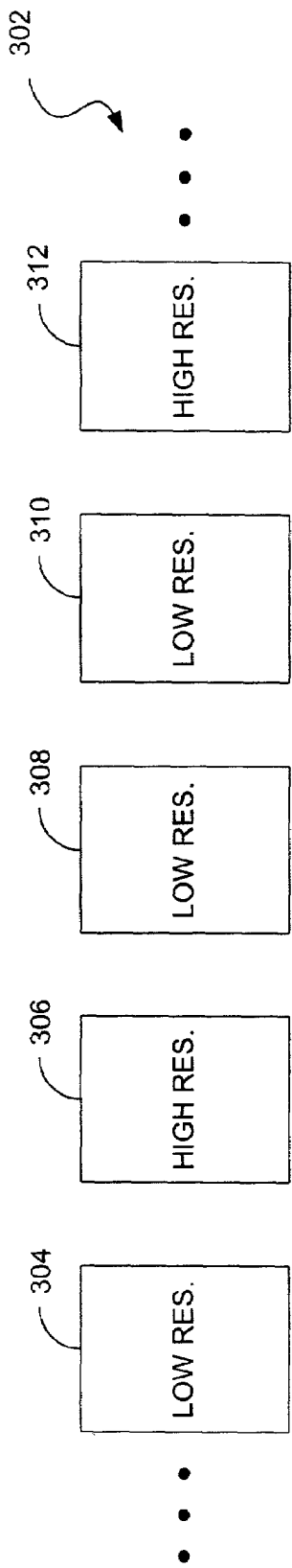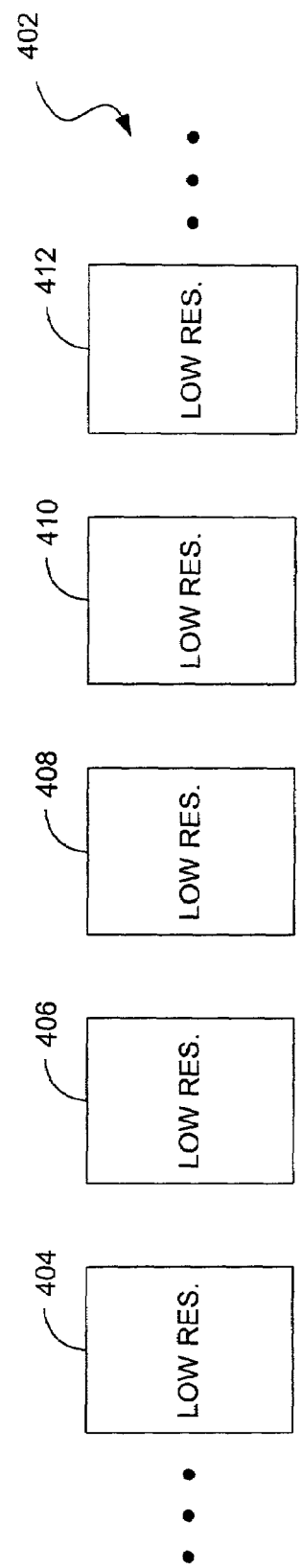
FIG. 3 STORED IMAGE DATA
FIG. 4 VIDEO DATA STREAM

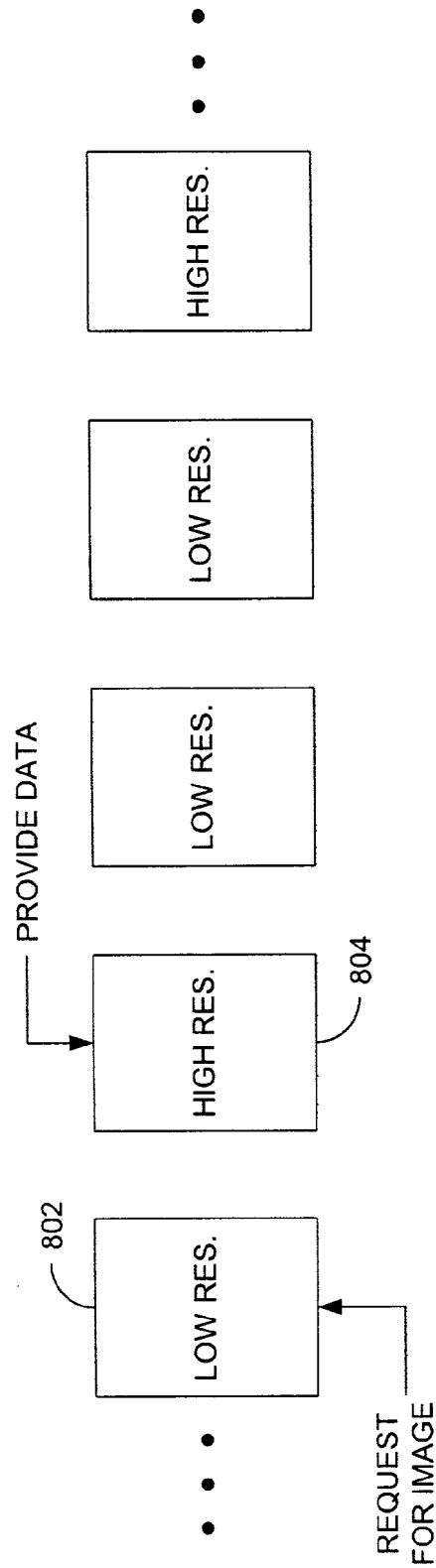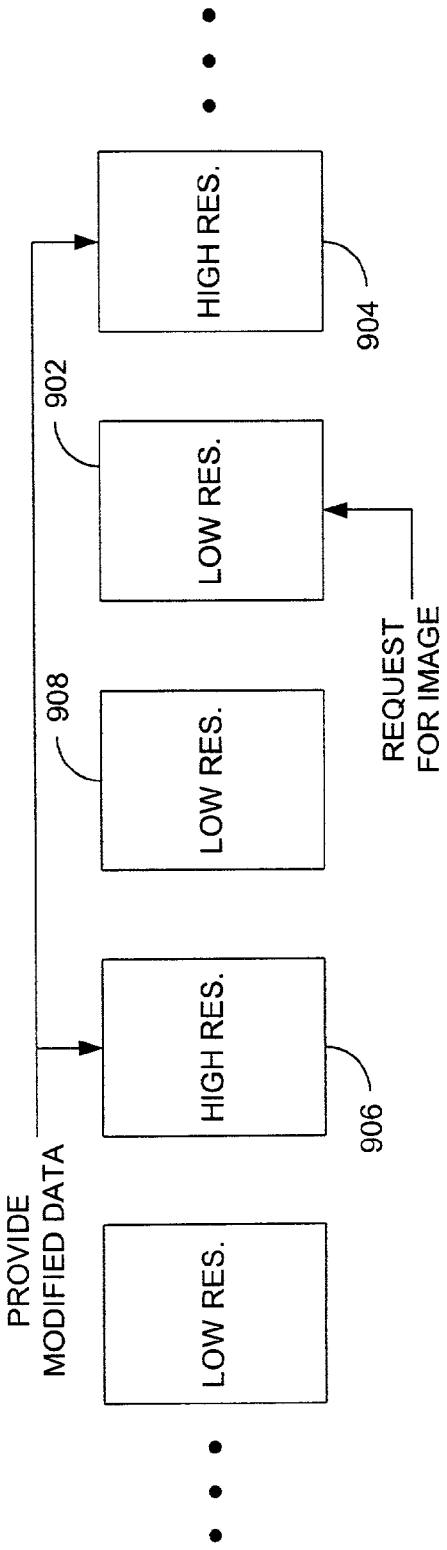

DIGITAL VIDEO IMAGING WITH HIGH-RESOLUTION STILL IMAGING CAPABILITY

BACKGROUND OF THE INVENTION

1. Field of the Invention

The present invention generally relates to digital imaging and, in particular, to systems and methods for providing digital video images that also are configured to provide relatively higher resolution still images.

2. Description of the Related Art

Digital video is presented to a viewer as a sequence of still images known as "frames." These frames typically are displayed to the viewer at a frame rate of approximately 30 frames per second. As is known, digital video characterized by a resolution of 640 pixel by 480 pixel or better is considered adequate quality for a typical digital video application. This resolution, i.e., 640 pixels by 480 pixels, is known as Video Graphics Array ("VGA") resolution.

Media, such as photographs or other print media, typically require a higher resolution than that typically provided by digital video in order to provide what is considered to be a resolution of adequate quality. By way of example, it is generally known that to provide a photograph of 8 inches by 10 inches, approximately 2 mega pixel resolution is required. This resolution approximately equates to a 1024 pixel by 768 pixel screen resolution. Thus, digital video typically is not provided at a resolution that readily supports conversion of a frame of the digital video to a print medium.

Oftentimes, it may be desirable to provide digital video providing enhanced resolution and/or an increased frame rate. Limitations, such as memory size and the total raw data speed of the pixels required, for example, tend to make fulfilling this desire impractical. Therefore, although it may be desirable to provide frames of digital video having improved resolution, the aforementioned and/or other limitations tend to restrict digital video to lower frame resolutions than those desirable in other applications, such as still imagery. Thus, the ability to provide still images on a print medium while using image data from digital video typically yields still images with less than adequate resolution.

By way of example, reference is made to the schematic diagram of FIG. 1, which depicts a representative frame 102 of digital video image data being rendered on a display device 104. As is known, the rendered image corresponding to the frame 102 possesses an appropriate resolution during such display. This may be due, at least in part, to the process of displaying image data of sequential frames at a frame rate of approximately 30 frames per second during normal viewing. However, when a user converts the digital video image data corresponding to frame 102 by rendering that data onto a print medium, such as onto paper 106 by printer 108, for example, the resulting image may possess less than desired resolution. For instance, the printed image may appear grainy or, otherwise, somewhat out of focus.

SUMMARY OF THE INVENTION

Briefly described, the present invention relates to digital imagery. In some embodiments, digital video images and corresponding still images, which exhibit a relatively higher resolution as compared to the resolution of the video images, are provided. In this regard, embodiments of the present invention may be construed as methods for providing digital video images and still images. In a preferred embodiment, the method includes the steps of: enabling frames of image data to be provided to a user for rendering as video images, the video images being configured for providing at a first resolution; receiving a request for image data corresponding to one of the frames of image data; and enabling image data corresponding to the requested one of the frames to be provided to the user for rendering as a still image, the still image being configured for providing at a second resolution. Preferably, the second resolution is higher than the first resolution.

Other embodiments of the present invention may be construed as imaging systems. In this regard, a preferred embodiment includes a video/still imaging system that is configured to provide frames of image data to a user for rendering as video images. The video images typically are configured with a first resolution. The video/still imaging system also is configured to receive a request for image data corresponding to one of the frames of image data. So configured, in response to receiving such a request, the video/still imaging system provides image data corresponding to the requested one of the frames to the user for rendering as a still image. Preferably, the still image is configured with a second resolution, which is higher than the first resolution.

In an alternative embodiment, the imaging system incorporates an image data storage medium that includes frames of image data. The frames are configured to be provided to a user for rendering as video images, which are configured for providing at a first resolution. Preferably, at least some of the frames are configured to be provided to the user for rendering as still images, which are configured for providing at a second resolution. This second resolution is higher than the first resolution.

Still other embodiments of the present invention may be construed as computer-readable media. In a preferred embodiment, the computer-readable medium includes logic configured to enable frames of image data to be provided to a user for rendering as video images, with the video images being configured for providing at a first resolution. Logic configured to receive a request for image data corresponding to one of the frames of image data and logic configured to enable image data corresponding to the requested one of the frames to be provided to the user for rendering as a still image also are provided. Preferably, the still image is configured for providing at a second resolution, which is higher than the first resolution.

Other embodiments of the present invention, which may not be specifically described herein, will be or become apparent to one with ordinary skill in the art upon examination of the following drawings and detailed description. It is intended that all such embodiments be considered within the scope of the invention as recited in the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a schematic diagram depicting a representative data flow provided by the video/still imaging system of FIG. 2.

FIG. 4 is a schematic diagram depicting a representative data flow provided by the video/still imaging system of FIG. 2.

FIG. 8 is a schematic diagram depicting a representative data stream provided by a preferred embodiment of the video/still imaging system of FIG. 2.

FIG. 9 is a schematic diagram depicting a representative data stream provided by an alternative embodiment of the video/still imaging system of FIG. 2.

DETAILED DESCRIPTION OF A PREFERRED EMBODIMENT

Figure 1:
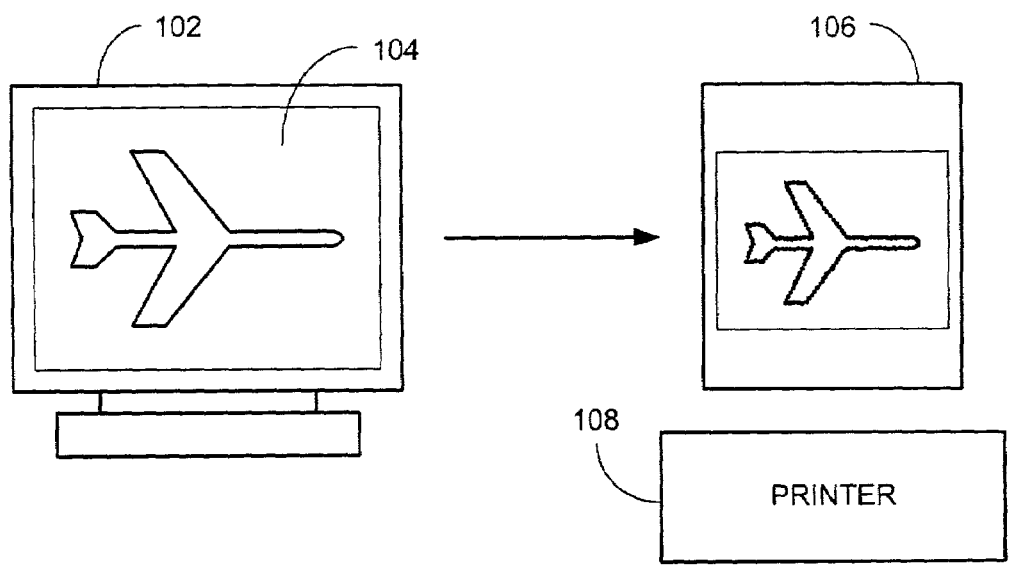
FIG. 1 is a schematic diagram depicting a representative video image and a corresponding printed image as generally is known in the prior art.
Figure 2:
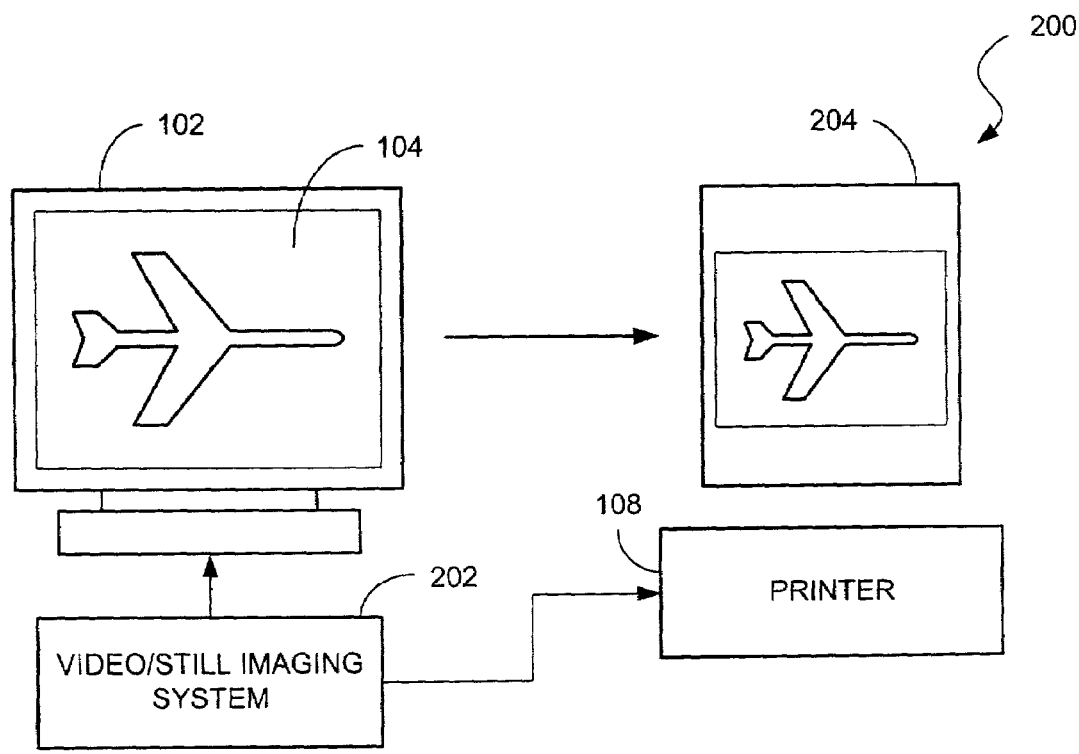
FIG. 2 is a schematic diagram depicting a preferred embodiment of the digital imaging system of the present invention.

As shown in FIG. 2, a preferred embodiment of the digital imaging system 200 of the present invention incorporates a video/still imaging system 202. Video/still imaging system 202 is configured to electrically communicate with a display device 202, such as a television, monitor, etc. So configured, video/still imaging system 202 is able to provide a stream of data to the display device, thereby facilitating display of digital video images 104 for viewing. Video/still imaging system 202 also is configured to electrically communicate with a printer 108. In this regard, video/still imaging system 202 also is able to provide a stream of data to printer 108, thereby facilitating printing of one or more still images corresponding to the aforementioned video images. By way of example, video/still imaging system 202 may facilitate printing of a photograph 204.

Referring now to FIGS. 3 and 4, functionality of a preferred embodiment of the video/still imaging system will be described in greater detail. As depicted in FIG. 3, video/still imaging system preferably provides image data 302 in the form of frames of data. More specifically, representative frames of data 304, 306, 308, 310, and 312 are depicted in FIG. 3. In some embodiments, image data may be captured by, stored by, and/or provided from the video/still imaging system, such as for rendering. Thus, when the image data is provided from the video/still imaging system for rendering, for example, the image data provided in the stream of data typically is arranged in frame order, e.g., data corresponding to the frames depicted in FIG. 3 is provided in the order depicted in FIG. 3.

In FIG. 3, frames 304, 308, and 310 include low-resolution image data. By way of example, the data provided in these frames may be characterized by VGA resolution (640 by 480 pixels). In contrast, frames 306 and 312 contain image data characterized by a relatively higher resolution, e.g., 1024 by 768 pixels, than that contained in frames 304, 308, and 310. It should be noted that the frames of higher resolution image data may be provided at virtually any predetermined interval relative to the low-resolution image data. By way of example, such a predetermined interval may be consistent through out the frames of image data or, alternatively, the interval may vary throughout the various frames. More specifically, high-resolution image data may be provided at a uniform distribution among the various frames of stored image data or may be provided in a non-uniform distribution.

As depicted in FIG. 4, embodiments of the video/still imaging system are able to provide a video data stream(s) corresponding to the stored image data. In particular, the embodiment depicted in FIG. 4 is configured to provide a data stream 402 that includes digital video data corresponding to frames 404, 406, 408, 410, and 412. Preferably, the frames of video image data are provided in a low-resolution format so as to be suitable for rendering on a video display device. In particular the video image data may be provided at VGA resolution. Thus, for those frames of video data corresponding to image data stored in a high-resolution format, the high-resolution image data preferably is compressed to a low-resolution format during construction of the video data stream. In this manner, although relatively higher resolution image data may be available for viewing, the video/still imaging system preferably provides low-resolution image data that is well suited for viewing as digital video. When it is desired that a still image corresponding to a portion of the digital video image data be printed as a still image, however, the video/still imaging system advantageously utilizes the embedded high-resolution image data for rendering a printed still image.

The video/still imaging system of the present invention can be implemented in software (e.g., firmware), hardware, or a combination thereof. Preferably, the video/still imaging system is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer that can implement the video/still imaging system of the present invention is shown in FIG. 5.

Figure 5:
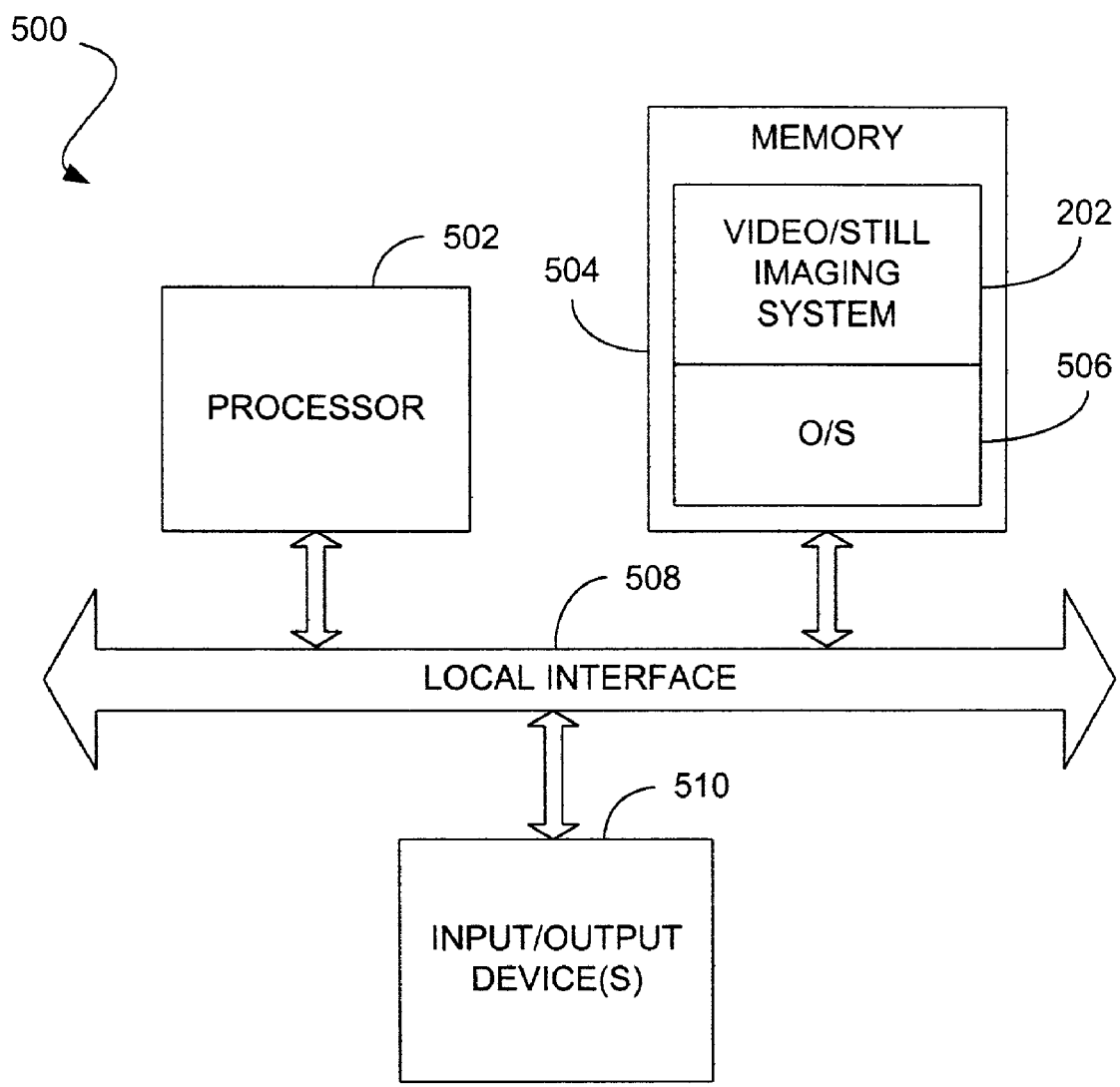
FIG. 5 is a schematic diagram depicting a computer or processor-based system that may be utilized to implement the video/still imaging system of FIG. 2.

Generally, in terms of hardware architecture, as shown in FIG. 5, the computer 500 includes a processor 502, memory 504, and one or more input and/or output (I/O) devices 506 (or peripherals) that are communicatively coupled via a local interface 508. The local interface 508 can be, for example but not limited to, one or more buses or other wired or wireless connections, as is known in the art. The local interface 508 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 502 is a hardware device for executing software that can be stored in memory 504. The processor 502 can be any custom made or commercially available processor, a central processing unit (CPU) or an auxiliary processor among several processors associated with the computer 500, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 504 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 504 may incorporate electronic, magnetic, optical, and/or other types of storage media. Note that the memory 504 can have a distributed architecture, where various components are situated remote from one another, but can be accessed by the processor 502.

The software in memory 504 may include one or more separate programs, each of which comprises an ordered listing of executable instructions for implementing logical functions. In the example of FIG. 5, the software in the memory 504 includes the video/still imaging system and a suitable operating system (O/S) 510. A nonexhaustive list of examples of suitable commercially available operating systems 510 is as follows: a Windows operating system from Microsoft Corporation, U.S.A., a Netware operating system available from Novell, Inc., U.S.A., or a UNIX operating system, which is available for purchase from many vendors, such as Sun Microsystems, Inc., Hewlett-Packard Company, U.S.A., and AT&T Corporation, U.S.A. The operating system 510 essentially controls the execution of other computer programs, such as the video/still imaging system, and provides scheduling, input-output control, file and data management, memory management, and communication control and related services.

The video/still imaging system 202 is a source program, executable program (object code), script, or any other entity comprising a set of instructions to be performed. When a source program, then the program needs to be translated via a compiler, assembler, interpreter, or the like, which may or may not be included within the memory 504, so as to operate properly in connection with the O/S 510. Furthermore, the video/still imaging system can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 506 may include input devices, for example but not limited to, a keyboard, mouse, scanner, microphone, etc. Furthermore, the I/O devices 506 may also include output devices, for example but not limited to, a printer, display, etc. Finally, the I/O devices 506 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 500 is a PC, workstation, or the like, the software in the memory 504 may further include a basic input output system (BIOS) (omitted for simplicity). The BIOS is a set of essential software routines that initialize and test hardware at startup, start the O/S 510, and support the transfer of data among the hardware devices. The BIOS is stored in ROM so that the BIOS can be executed when the computer 500 is activated.

When the computer 500 is in operation, the processor 502 is configured to execute software stored within the memory 504, to communicate data to and from the memory 304, and to generally control operations of the computer 500 pursuant to the software. The video/still imaging system 202 and the O/S 510, in whole or in part, but typically the latter, are read by the processor 502, perhaps buffered within the processor 502, and then executed.

When the video/still imaging system 202 is implemented in software, as is shown in FIG. 5, it should be noted that the video/still imaging system can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The video/still imaging system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the video/still imaging system is implemented in hardware, the video/still imaging system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
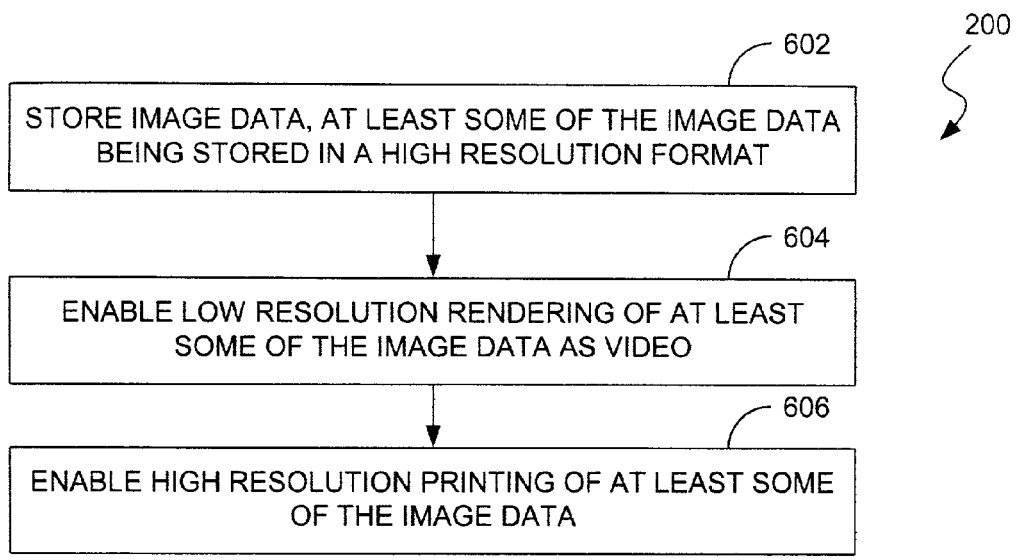
FIG. 6 is a flow chart depicting preferred functionality of the digital imaging system of FIG. 1.
Figure 7:
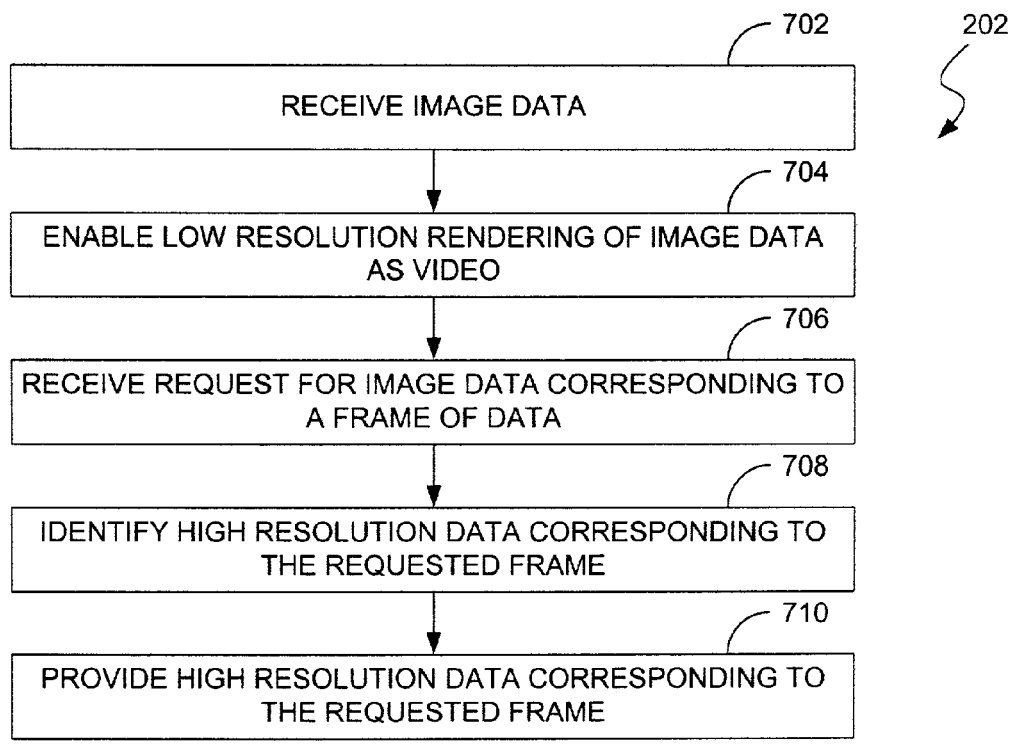
FIG. 7 is a flow chart depicting preferred functionality of the video/still imaging system of FIG. 2.

The flowcharts of FIGS. 6 and 7 depict functionality of preferred implementations of the imaging system 200 and video/still imaging system 202 of the present invention, respectively. In this regard, each block of the respective flowcharts represent a module segment or portion of code which comprises one or more executable instructions for implementing the specified logical function or functions. It should also be noted that, in some alternative implementations, the functions noted in the various blocks may occur out of the order depicted in the figures. For example, two blocks shown in succession in FIG. 6 may, in fact, be executed substantially concurrently where the blocks may sometimes be executed in the reverse order depending upon the functionality involved.

As depicted in FIG. 6, the functionality of a preferred embodiment of the imaging system or method 200 may be construed as beginning at block 602 where image data is stored. More specifically, in preferred embodiments, at least some of the image data being stored is provided in a high-resolution format, e.g., 1024 by 768 pixels. In various embodiments, the image data may be stored in various formats and on various media, including, for example, DVD, or other computer readable medium. As depicted in block 604, low-resolution video rendering of at least some of the stored image data is enabled. Thereafter, such as depicted in block 606, high-resolution processing of at least some of the image data is enabled. In particular, preferred embodiments may facilitate printing a high-resolution still of image data corresponding to a portion of the stored image data.

Referring now to the flowchart of FIG. 7, the functionality of a preferred embodiment of the video/still imaging system or method 202 may be construed as beginning at block 702 where image data is received. In block 704, low-resolution video rendering of image data is enabled. Thereafter, such as depicted in block 706, a request for image data corresponding to one or more frames of the image data may be received. In response thereto, such as depicted in block 708, high-resolution data corresponding to the requested frame may be identified. Thereafter, high-resolution image data corresponding to the requested frame may be provided (block 710).

As mentioned hereinbefore, preferred embodiments of the video/still imaging system are configured to provide high-resolution image data corresponding to a requested frame of video data so that the high-resolution image data may be utilized for printing, for example. Since limitations of memory, e.g., size, may prevent storage of high-resolution image data corresponding to every frame of low-resolution video data, it may be possible for a user to request high-resolution image data corresponding to a frame of video and the system may not possess high-resolution image data corresponding to the requested frame.

In some embodiments, when a request for a frame of high-resolution image data is received, the system may provide high-resolution image data to a viewer that most closely corresponds to the requested frame. By way of example, if a viewer has requested high-resolution data relating to frame 802 (FIG. 8) and high-resolution image data corresponding to frame 802 is unavailable, the video/imaging system may provide high-resolution image data contained in frame 804. In other embodiments, since each frame of low-resolution data preferably has both a corresponding preceding frame of high-resolution image data and a succeeding frame of high-resolution image data, a viewer maybe provided with high-resolution image data corresponding to each of the aforementioned frames. In these embodiments, the user may be prompted to select between those frames of high-resolution data most closely corresponding to the frame about which image data was requested.

As depicted in FIG. 9, an alternative embodiment is provided. As shown therein, if a viewer requests image data associated with a frame 902, for example, the video/still imaging system may access a frame of high-resolution image data (frame 904) most closely corresponding to the requested frame. The video/still imaging system may then modify the high-resolution image data with reference to the other high-resolution frame, e.g., frame 906, that bounds the requested frame. So configured, high-resolution image data may be modified to more closely approximate the requested low-resolution frame, albeit at a higher resolution.

In other embodiments, various other frames of image data can be utilized. For instance, one or more frames of high-resolution image data and/or one or more frames of low-resolution image data, such as image data from frames 902 and 908, may be utilized during data modification. It should be noted that, although described herein as involving modification of the high-resolution image data, in some embodiments, the frame of low-resolution image data corresponding to the requested frame may be modified with reference to the high-resolution image data in order to provide modified image data for rendering as a still image.

Figure 10:
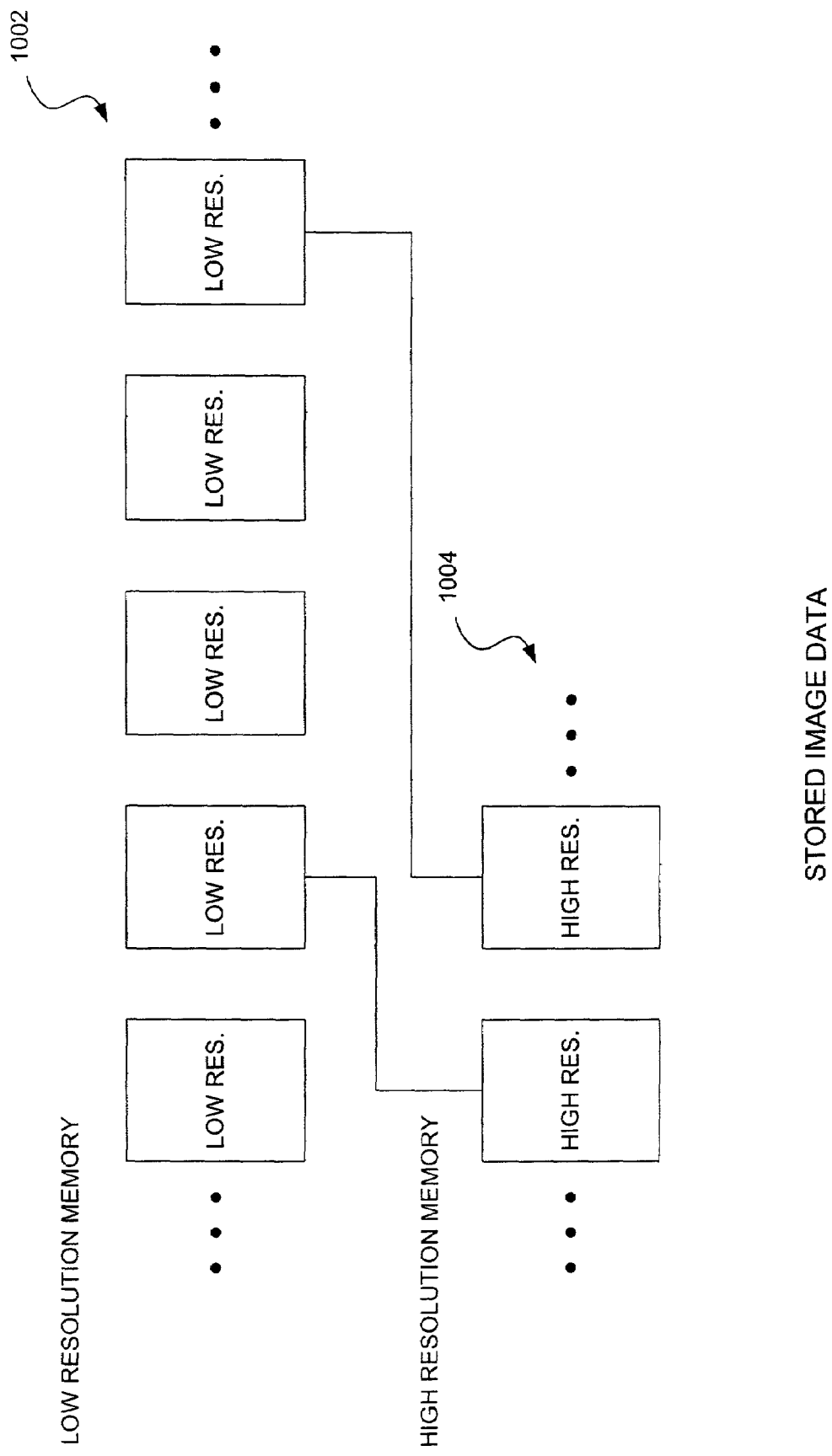
FIG. 10 is a schematic diagram depicting a representative data stream provided by an alternative embodiment of the video/still imaging system of FIG. 2.

As mentioned hereinbefore, high-resolution image data corresponding to each frame of low-resolution video data advantageously is provided by embodiments of the present invention. However, since practical limitations, such as available memory space, for example, typically predominate many aspects of digital imaging, high-resolution image data only may be provided for a subset of the digital video frames. In some embodiments, this may be accomplished by providing multiple files of image data. By way of example, the embodiment depicted in FIG. 10 utilizes a portion(s) 1002 of memory to store low-resolution frames of video data and a portion(s) 1004 of memory for storing high-resolution image data.

In order that a particular frame of high-resolution image data may be readily identified as being associated with a particular frame or frames of low-resolution image data, corresponding frames may be linked to each other. By way of example, each frame of data may include a maker that specifically identifies a corresponding frame(s) or, alternatively, identifies a memory location at which the corresponding frame(s) is located. Thus, when the video/still imaging system receives a request for high-resolution data associated with a particular frame of video data, the video/still imaging system may access the portion(s) of memory allocated for high-resolution image data storage and locate the corresponding high-resolution data. This high-resolution data then may be provided to the user for rendering a still image, for example.

In other embodiments, such as the video/still imaging system depicted in FIG. 8, for example, the frames of image data are provided in data stream order. In some of these embodiments, when a high resolution frame of image data is encountered during construction of a video data stream, the frame of data is compressed so as to provide low resolution data to the data stream for rendering as digital video.

It should be noted that the terms low-resolution and high-resolution have generally been utilized herein as referring to VGA resolution and to mega pixels resolution, respectively. However, as it is axiomatic that improvements in resolution for both video and still/imagery will be obtainable over time, these terms should be generally be guarded as relative terms, wherein high-resolution refers to a resolution that is higher than that provided by low-resolution.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A method for providing digital video images and still images comprising:

providing sequential frames of image data to a user for rendering as video images, the video images being configured for providing at a first resolution, at least some of the image data being stored at a second resolution higher than the first resolution;

responsive to a user input corresponding to viewing the image data as video images, automatically converting at least some of the image data configured with the second resolution such that the frames provided to the user for rendering as video images are configured with the first resolution;

displaying the sequential frames of image data as video images at the first resolution;

receiving a request for image data corresponding to one of the video images; and providing image data corresponding to the requested one of the video images to the user at the second resolution such that a still image corresponding to the requested one of the video images is obtained at the second higher resolution.

2. The method of claim 1, wherein providing frames of image data to a user for rendering as video images comprises:
enabling the frames of image data to be provided to the user at a resolution of 640 pixels by 480 pixels.

3. The method of claim 1, wherein providing image data corresponding to the requested one of the video images comprises:
enabling image data corresponding to the requested one of the video images to be provided to the user at a resolution of 1024 pixels by 768 pixels.

4. The method of claim 1, wherein the image data configured with the second resolution is intermittently disposed among the frames of image data.

5. The method of claim 1, wherein automatically converting comprises:
compressing the at least some of the image data configured with the second resolution such that the frames provided to the user for rendering as video images are configured with the first resolution.

6. The method of claim 1, wherein receiving a request for image data corresponding to one of the video images comprises:
enabling a frame of second resolution image data most closely corresponding to the requested video image to be provided to the user for rendering as a still image.

7. The method of claim 1, wherein receiving a request for image data corresponding to one of the video images comprises:
enabling modification of image data such that image data to be provided to the user for rendering as a still image is provided at a resolution higher than the first resolution.

8. The method of claim 7, wherein enabling modification of image data comprises:
enabling modification of the two frames of second resolution image data most closely corresponding to the requested frame of image data.

9. The method of claim 7, wherein enabling modification of image data comprises:
enabling modification of at least the one frame of second resolution image data most closely corresponding to the requested frame of image data.

10. An imaging system comprising:
a video/still imaging system configured to provide frames of image data to a user for rendering as video images of a first resolution, said video/still imaging system storing at least some of the frames of image data at a higher, second resolution,
wherein said video/still imaging system compresses image data configured with the second resolution such that image data provided to the user for rendering as video images is automatically configured with the first resolution, responsive to a user request to display the image data as video images;
said video/still imaging system being further configured to receive a request for image data corresponding to one of the frames of image data such that, in response thereto, said video/still imaging system automatically provides image data corresponding to the requested one of the frames to the user for rendering as a still image, the still image being configured with the second resolution.

11. The imaging system of claim 10, further comprising:
means for receiving a request for image data corresponding to one of the frames of image data.

12. The imaging system of claim 10, further comprising:
means for storing frames of image data.

13. An imaging system comprising:
an image data storage medium having sequential frames of image data stored thereon, said frames being configured to be automatically provided to a user for rendering as video images, responsive to a user request to view the image data as video images, the video images being configured for providing at a first resolution;

at least some of said sequential frames being configured to be provided to the user for rendering as still images, the still images being configured to be automatically provided at a second resolution, responsive to a user request to view the image data as still images, the second resolution being higher than the first resolution such that, when the user is viewing the image data as video images and requests to view an image corresponding to one of the video images as a still image, the second resolution image data is automatically provided, thereby providing the user with higher resolution image data than that provided by the video images.

14. A computer readable medium having a computer program for providing digital video images and still images, said computer readable medium comprising:
logic configured to enable sequential frames of image data to be automatically provided to a user for rendering as video images, the video images being configured for providing at a first resolution despite at least some of the sequential frames of image data being stored at a higher, second resolution;

logic configured to receive a request for image data corresponding to one of the sequential frames of image data; and logic configured to enable image data corresponding to the requested one of the sequential frames to be provided to the user for rendering as a still image, the still image being configured for providing at the second resolution such that, when the user is viewing the sequential frames as video images and requests to view one of the sequential frames as a still image, the second resolution image data is automatically provided, thereby providing the user with higher resolution image data than that provided by the video images.

15. The computer readable medium of claim 14, wherein the logic configured to enable sequential frames of image data to be provided to a user for rendering as video images comprises:

logic configured to compress the at least some of the image data configured with the second resolution such that the sequential frames provided to the user for rendering as video images are configured with the first resolution.

16. The computer readable medium of claim 14, wherein the logic configured to receive a request for image data corresponding to one of the sequential frames of image data comprises:

logic configured to receive a request for image data corresponding to one of the sequential frames of image data configured at the first resolution; and wherein the logic configured to enable image data corresponding to the requested one of the sequential frames to be provided to the user for rendering as a still image comprises:

logic configured to enable the frame of second resolution image data most closely corresponding to the requested frame of image data to be provided to the user for rendering as a still image.

* * * * *